Oct. 29, 1963

P. PATZ 3,108,571

ARCUATE BUNK FEEDER WITH AUTOMATIC
REVERSIBLE FEED CONVEYOR MECHANISM

Filed Jan. 4, 1963

INVENTOR.
PAUL PATZ

BY

Lieber & Nilles

ATTORNEYS

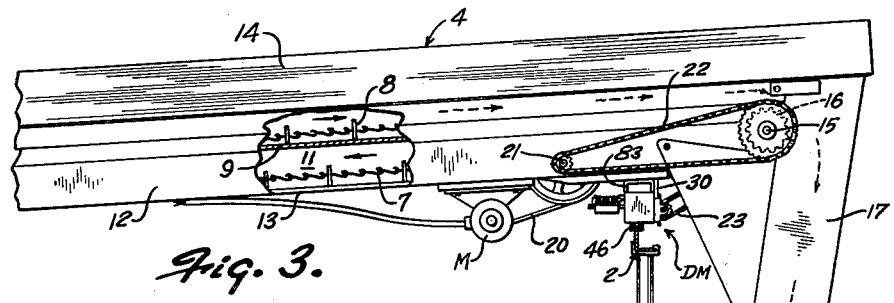
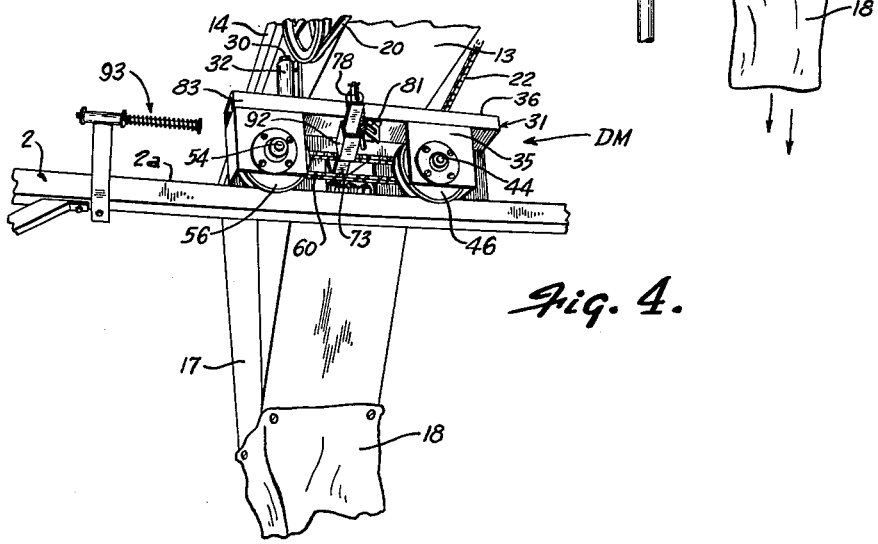
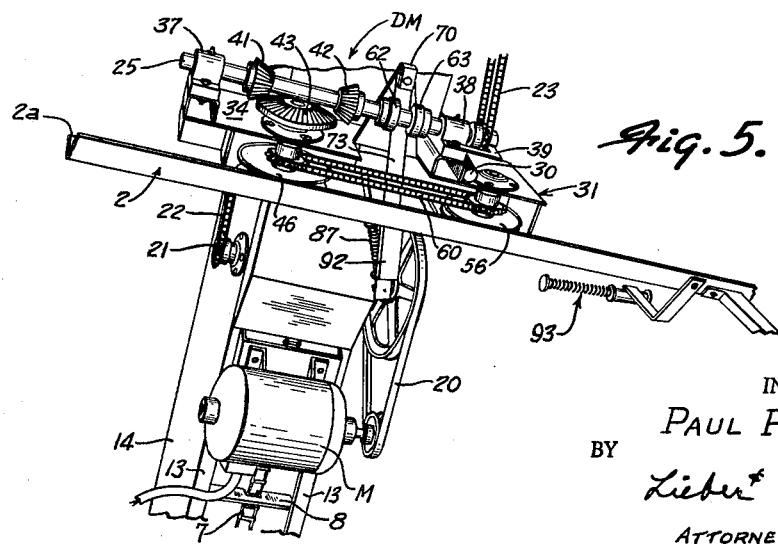

Oct. 29, 1963

P. PATZ 3,108,571

ARCUATE BUNK FEEDER WITH AUTOMATIC
REVERSIBLE FEED CONVEYOR MECHANISM

Filed Jan. 4, 1963

INVENTOR.
PAUL PATZ
BY
Lieber & Nilles
ATTORNEYS

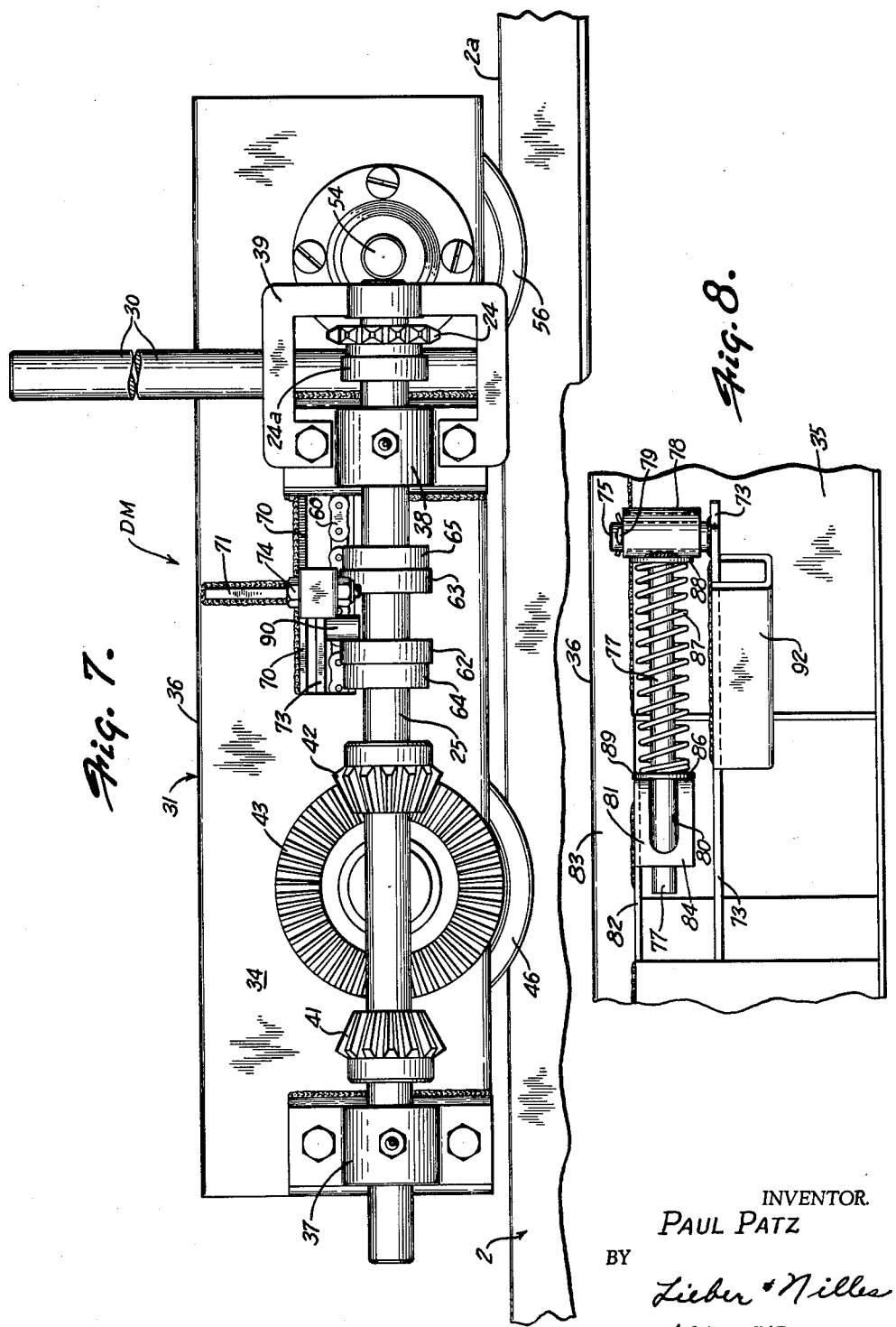

United States Patent Office 3,108,571
Patented Oct. 29, 1963

3,108,571
ARCUATE BUNK FEEDER WITH AUTOMATIC REVERSIBLE FEED CONVEYOR MECHANISM
Paul Patz, Pound, Wis.
Filed Jan. 4, 1963, Ser. No. 249,426
9 Claims. (Cl. 119—51)

This invention relates to mechanisms for reversing the direction of power being transmitted, and finds particular though not exclusive utility in a cattle feeder where a swingable conveyor is frequently reversed in its movement along the length of the bunk feeder.

In reversing mechanisms of the type to which the present invention relates, the mechanism is actuated by its movable actuating element striking an obstruction located at the end of the path of travel in one direction. The force imparted to the actuating element must be positive and sufficiently forceful and of such duration that the mechanism is positively shifted from one direction to the other and without dwelling in a neutral position. Stated otherwise, the momentum of the moving mechanism and its inertia must continue until the mechanism is completely shifted, but when the shifting is completed, the mechanism must without hesitation begin its movement in the reverse direction.

Accordingly, the present invention provides a reversing mechanism of the above type which has these desirable characteristics and advantages.

More specifically, the present mechanism is positively driven in one direction until the power drive of the mechanism has been reversed; there is no loss of actuating force or momentum right up to the time the mechanism begins its reverse travel.

The present invention provides a mechanism of the above type which remains in positive driving engagement with its supporting rail, notwithstanding the fact that the rail may not be formed as a true arc of a radius.

These and other objects and advantages will appear hereinafter as this disclosure progresses, reference being had to the accompanying drawings, in which:

FIGURE 3 is an elevational view of the conveyor end shown in FIGURE 2, but taken from the opposite side, and on a smaller scale, and showing certain parts in section or broken away;

FIGURE 4 is a perspective view, taken generally from beneath the end of the conveyor and showing the inner side of the drive mechanism;

FIGURE 5 is another perspective view from beneath the conveyor end, but taken more from the outer side of the drive mechanism;

FIGURE 7 is an outer side elevational view of the drive mechanism as shown in FIGURE 6; and FIGURE 8 is an elevational view taken along line 8—8 in FIGURE 6.

The present invention will be shown and described as used in connection with a bunk feeder for cattle, where the invention has found particular utility, but the invention is not to be limited to any particular use.

Figure 1:
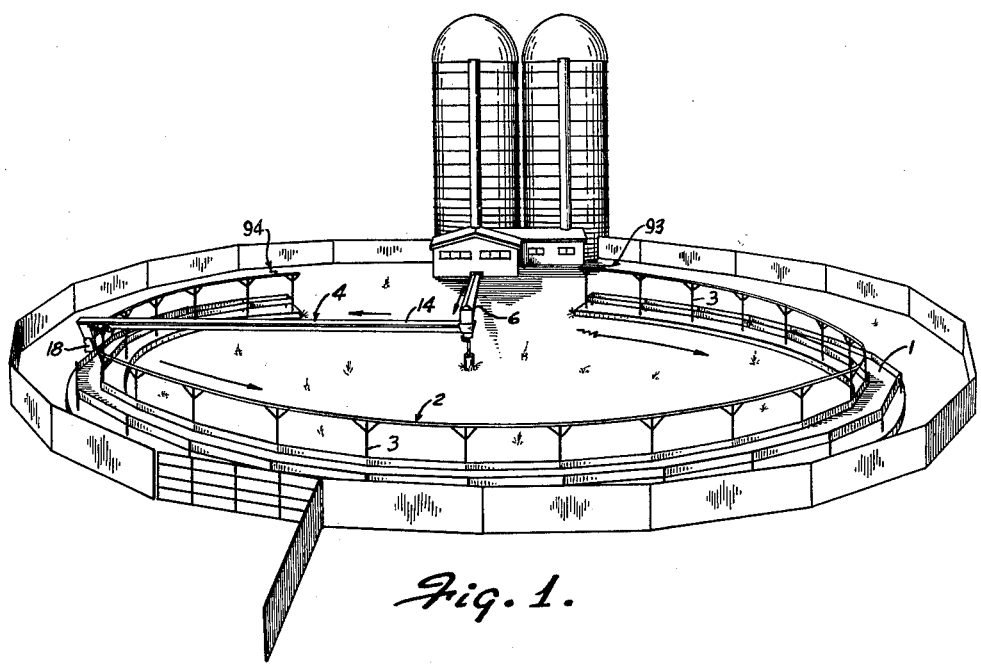
FIGURE 1 is a perspective view of a bunk feeder for cattle which utilizes the present invention.

Referring in general to the overall operation of the bunk feeder, FIGURE 1 shows an arcuate bunk or trough 1 which is unobstructed along each side of its entire length to permit cattle to have complete access thereto. A rail 2 is mounted on posts 3 along the bunk and a distance above it and is generally coextensive in length with the bunk. It will be noted the rail is formed of an angle iron having a vertical flange 2a. A swingable conveyor 4 is pivotally mounted at its inner end and at the center of the arcuate bunk. The free or discharge end of this conveyor is supportingly mounted on the rail 2 by the drive mechanism DM, to be described. The feed material is thus evenly distributed by the discharge end of the conveyor as the latter swings back and forth along the bunk.

A stationary, preliminary conveyor 6 has a discharge end located in feeding relationship to and directly above the pivoted end of the swinging conveyor. This preliminary conveyor thereby serves to convey feed from the silos to the swingable conveyor.

If a more complete description of the bunk, the conveyors, or the general operation is deemed to be either necessary or desirable, reference may be had to my co-pending U.S. application, Serial No. 147,496, filed October 25, 1961, entitled "Bunk Feeder." It is believed to be sufficient for purposes of this disclosure, however, to say that the feed must be spread evenly and quickly throughout the desired length of the bunk being filled, and without any attention being required on the part of an operator. As a result, the drive and reversing mechanism for the swingable conveyor must be positive and reliable in operation.

Referring in greater detail to the drawings, the conveyor 4 has been shown as of the endless paddle type, although other types could be utilized with this invention. This conveyor itself is conventional in construction and includes an endless chain 7 having series of transverse, feed moving paddles 8 secured at spaced locations along its length. The upper flight of the chain moves outwardly toward the bunk and moves the feed along the floor 9 of the conveyor. The endless chain operates within a housing comprising side walls 11 and 12, a bottom wall 13, and a removable top 14. The chain is trained over a shaft at each end of the housing, only the driving shaft 15 being shown and which is located adjacent the conveyor discharge end. The shaft 15 has a driving sprocket 16 fixed thereto for driving engagement with the chain.

A downwardly extending chute 17 is secured at the end of the conveyor for directing the discharged feed into the bunk and thereby preventing spilling due to the wind or swinging movement of the conveyor. A flexible, tubular sleeve 18 then extends downwardly from the chute and into proximity with the bunk for further guiding the falling feed without disturbing the feeding cattle.

An electric motor M furnishes the driving power for both the endless conveyor 4 and the drive mechanism DM. This motor is mounted on the underside of the conveyor and has a driving connection, in the form of an endless belt 20, with a layshaft 21 journalled in the conveyor housing. The layshaft 21 then transmits the power through an endless chain 22 located on the other end of the layshaft, and which chain is then drivingly connected to one end of the conveyor shaft 15. From the other end of shaft 15 another endless chain 23 extends in driving relationship with a sprocket 24 slidably splined on a drive shaft 25 of the drive mechanism DM now to be described.

Figure 2:
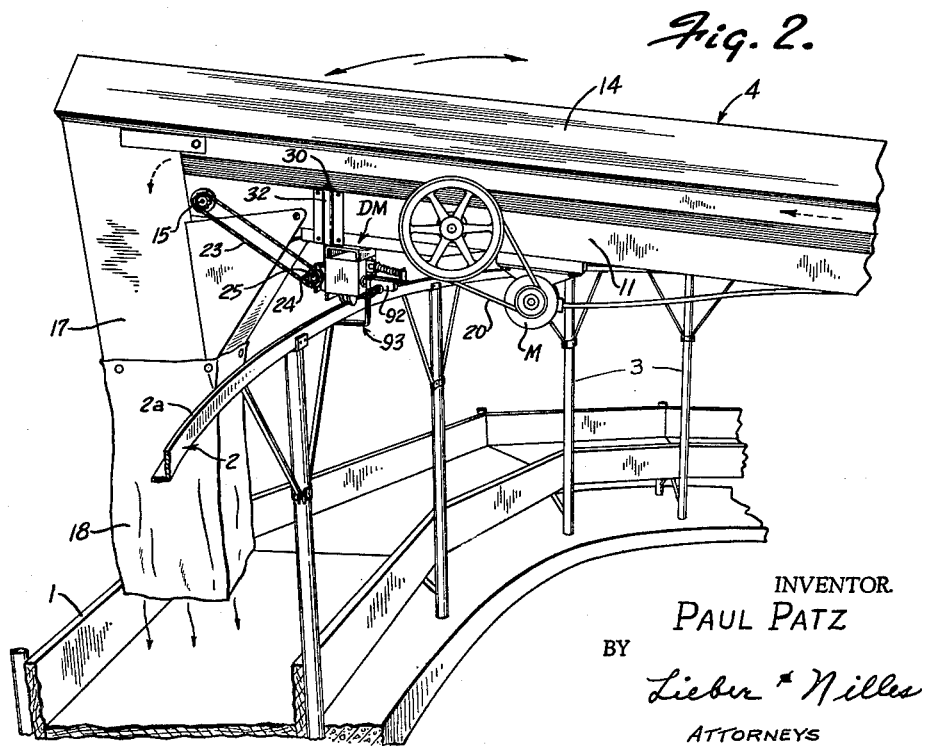
FIGURE 2 is a perspective view of the discharge end of the swinging conveyor as shown in FIGURE 1, but on an enlarged scale.

The mechanism DM is pivotally mounted on the conveyor end on a generally vertical axis formed by a shaft 30 that is welded to the support frame 31 of the mechanism. The shaft 30 is mounted in a complementary tube 32 (FIGURES 2 and 4) bolted alongside the conveyor housing. It will be noted that this pivotal connection, which permits the drive mechanism to swing relative to the conveyor proper, is generally in alignment with or adjacent to the sprocket 24. Thus, as the mechanism swings relative to the conveyor in following the guide rail 2, the chain 23 does not become either too loose or tight.

The drive mechanism frame can be fabricated from heavy sheet steel in various ways but is shown as including the front wall 34, rear wall 35, and top wall 36. A pair of bearing brackets 37 and 38 are fixed to the wall 34 and in which is slidably journalled the shaft 25. As the shaft is slid in one axial direction or the other, by means to be described, the sprocket keyed thereto remains axially stationary in the keeper bracket 39 which surrounds it. The sprocket 24 includes a hub portion 24a formed integrally therewith for providing the necessary strength and bearing support for the sprocket.

A pair of drive elements in the form of opposing bevel gears 41 and 42 are fixed to shaft 25 in spaced relationship to one another and on either side of the larger bevel gear 43 with which they alternately mesh as the shaft 25 is axially shifted in one direction or the other.

The gear 43 is considered a drive engaging member and is fixed to a shaft 44 rotatably mounted in suitable bearings in the walls 34 and 35. Another shaft 54 is also similarly journalled in the walls, in parallelism to shaft 44 and spaced therefrom. Shafts 44 and 54 have a peripherally grooved wheel 46 and 56, respectively, fixed thereto, and also have a sprocket 47 and 57, respectively, fixed thereto. An endless roller chain 60 drivingly connects the sprockets and thus the wheels for rotation together. The wheels 46 and 56 are thus the driven members, but only one may be necessary, or other forms of driven members may be used with the invention.

Mounted on shaft 25 is a pair of spaced apart thrust collars 62 and 63 which are prevented from being spread axially part by the retaining collars 64 and 65, respectively, fixed on the shaft by set screws 66.

The means for axially shifting the shaft 25, and consequently causing reversal of the direction of drive, will now be described.

A mounting plate 70 is welded to the wall 34 and reinforced by the gusset 71 welded therebetween. The free end of this plate is bifurcated and a shifting lever 73 is pivotally mounted in this bifurcated end by bolt means 74.

Figure 6:
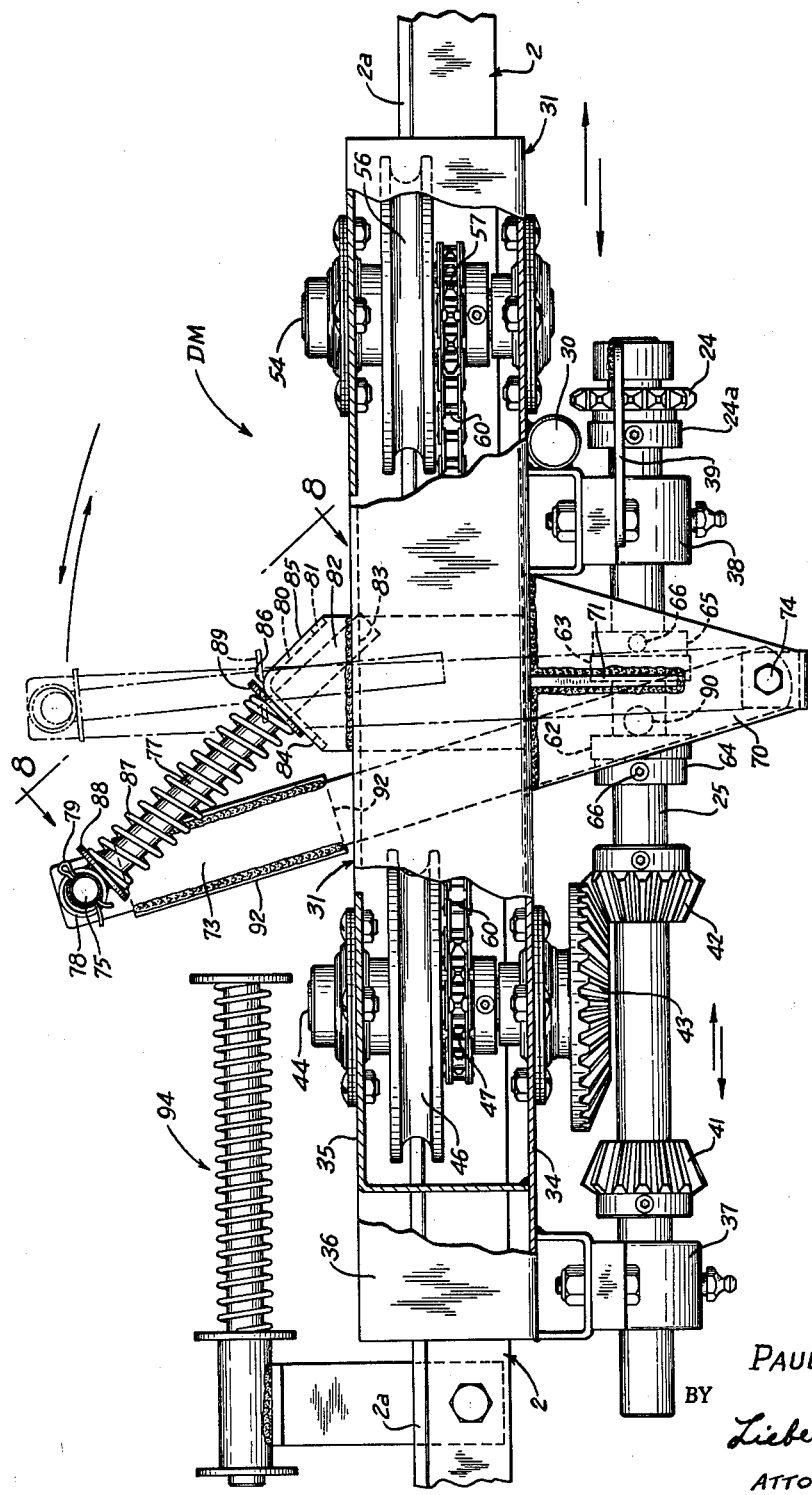
FIGURE 6 is an enlarged top plan view of the reversible drive mechanism, shown in the other figures, but on an enlarged scale and with certain parts in section or broken away for clarity.

A resilient connection is provided between the free end of the lever and the frame which acts to resiliently hold the lever and consequently the shaft 25, in one engaged position or the other. This connection comprises a compressible spring-strut which forms an overcenter linkage between the free end of the lever and the frame. A short post 75 is welded to the free end of this lever and on which post is pivoted a rod 77 by means of its sleeve 78. Sleeve 78 is welded to one end of rod 77 and is held captive on the post by cotter key 79 (FIGURES 6 and 8).

Rod 77 extends through a slot 80 in an angle bracket 81 which is rigidly fixed on the frame 31 by plate 82 to which it is welded and reinforced by brace 83.

The bracket 81 is formed of two sides 84 and 85 arranged at right angles to one another and which are joined together by the rounded corner 86. The bracket is actually formed by a single piece of heavy plate steel which is bent to form the rounded corner 86.

A spring 87 is mounted on the rod 77 together with a thrust bearing washer 88 and 89 at each end, and this spring in effect bears against the post 75 and the bracket 81 tending to urge them apart. In this manner, the spring forcibly but resiliently holds the lever 73 in one of its extreme positions or the other.

The shifting lever 73 has a pin 90 welded to its underside and extending downwardly therefrom. This pin extends between the collars 62 and 63 (FIGURE 7) and is of such diameter that it does not fill the space between these collars.

Also secured by welding to the underside of lever 73 is a block 92 which is alternately engaged by spring loaded plungers 93 or 94 which are secured at spaced apart locations on the rail 2. These plungers act to force the lever 73, against the action of the spring 87, to swing across the rounded corner 86 of the slotted bracket 81 and to the opposite position, thereby shifting the shaft 25 by means of the pin 90, and engaging the other bevel gear on shaft 25.

The action of the lever 73 in being shifted from one position to the other should now be explained more fully. Before that, however, it should be remembered that it is necessary for the swinging conveyor and drive mechanism to have enough momentum to quickly and positively shift the gears while still travelling in the first direction. Then, as soon as the shift is made, the mechanism and its conveyor must immediately begin its reverse movement in a second direction and without any hesitation or dwell. To do this, the mechanism must continue to drive itself to the end of its travel in the first direction, and then be shifted without dwelling in a neutral position.

The action of lever 73 is rapid and it instantaneously snaps one gear on shaft 25 out of engagement with the common gear 43, and the other gear into driving engagement. For example, assume the lever is in the full-line position shown in FIGURE 6. When the gear 42 has caused the mechanism, that is the lever 73, to be driven against plunger 94 to the extent indicated by the broken lines, the gear 42 is still in driving mesh with gear 43. During this time, the "play" between pin 90 and collar 63 has been taken up.

When the rod 77 reaches the rounded corner 86, the spring has reached its fully cocked or compressed position, and immediately prior to the lever 73 going over the deadcenter position (in respect to pivot points 74 and 75), the gear 42 ceases to mesh with gear 43. At that time, the spring 87 forcibly snaps the lever to the extreme right (as viewed in FIGURE 6), and gear 41 drivingly engages gear 43.

The exact neutral position where neither of the gears 41 or 42 mesh with the common gear is very limited and occurs when the lever is going over dead center. The timing is such that no hesitation or delay occurs, and the action is completely positive.

The bracket 81 can be considered part of the frame and its two sides 84 and 85 act as lever holding surfaces, with the overcenter corner 86 therebetween. The spring 87, in effect, is pivoted at one end to the post 75 and its other end bears against either one of the holding surfaces 84 and 85.

Various modes of carrying out the invention are contemplated as being within the scope of the following claims particularly pointing out and distinctly claiming the subject matter which is regarded as the invention.

I claim:

1. In a bunk feeder mechanism of the type having an elongated and arcuate bunk which is unobstructed along each side to permit cattle to have access thereto, an overhead rail adjacent and above said bunk and generally coextensive in length therewith, an elongated conveyor arranged generally transversely to said bunk and having a feed receiving end and a feed discharge end, said conveyor being pivotally mounted at said receiving end for swinging movement generally horizontally along said bunk, said discharge end being located above said bunk for travel therealong as said conveyor swings along said bunk whereby feed is discharged by said conveyor into and along the length of said bunk; a power drive reversing mechanism carried on said conveyor adjacent its discharge end and for engaging said rail to drive said conveyor therealong, said mechanism comprising, a support frame, a drive shaft rotatbaly mounted on said frame and shiftable in either axial direction, a driven wheel on said frame for travel on and along said rail, said wheel having a drive engaging member, a pair of drive elements secured to said shaft at axially spaced locations therealong, said elements being shiftable with said shaft for selective engagement with said drive engaging member, a swingable shifting lever pivotally mounted at one end on said frame and having a connection with said shaft for axially shifting the latter between one position in which one of said elements engages said member and another position in which the other of said elements engages said member, a resilient connection between a free end of said lever and said frame and acting to resiliently hold said lever and consequently said shaft in said one position or the other, said connection comprising a compressible spring-strut pivotally connected to said lever free end and to said frame to form an over-center linkage therebetween, and actuating means carried at spaced locations along said rail for engagement by said lever to cause swinging of the latter and consequent reversal of said mechanism.

2. In a bunk feeder mechanism of the type having an elongated and arcuate bunk which is unobstructed along each side to permit cattle to have access thereto, an overhead rail adjacent and above said bunk and generally coextensive in length therewith, an elongated conveyor arranged generally transversely to said bunk and having a feed receiving end and a feed discharge end, said conveyor being pivotally mounted at said receiving end for swing movement generally horizontally along said bunk, said discharge end being located above said bunk for travel therealong as said conveyor swings along said bunk whereby feed is discharged by said conveyor into and along the length of said bunk; a power drive reversing mechanism carried on said conveyor adjacent its discharge end and for engaging said rail to drive said conveyor therealong, said mechanism comprising, a support frame, a drive shaft rotatably mounted on said frame and shiftable in either axial direction, a driven wheel on said frame for travel on and along said rail, said wheel having a drive engaging member, a pair of drive elements secured to said shaft at axially spaced locations therealong, and one on either side of said drive engaging member, said elements being shiftable with said shaft for selective engagement with said drive engaging member, a swingable shifting lever pivotally mounted at one end on said frame and having a connection intermediate its length with said shaft for axially shifting the latter between one position in which one of said elements engages said member and another position in which the other of said elements engages said member, and a compressible spring-strut pivotally connected to said lever free end and to said frame to form an over-center linkage therebetween which resiliently holds said lever in said one position or the other, and actuating means carried at spaced locations along said rail for engagement by said lever to cause swinging of the latter and consequent reversal of said mechanism.

3. In a bunk feeder mechanism of the type having an elongated and arcuate bunk which is unobstructed along each side to permit cattle to have access thereto, an overhead rail adjacent and above said bunk and generally coextensive in length therewith, an elongated conveyor arranged generally transversely to said bunk and having a feed receiving end and a feed discharge end, said conveyor being pivotally mounted at said receiving end for swinging movement generally horizontally along said bunk, said discharge end being located above said bunk for travel therealong as said conveyor swings along said bunk whereby feed is discharged by said conveyor into and along the length of said bunk; a power drive reversing mechanism carried on said conveyor adjacent its discharge end and for engaging said rail to drive said conveyor therealong, said mechanism comprising, a support frame, a drive shaft rotatably mounted on said frame and shiftable in either axial direction, a driven wheel on said frame for travel on and along said rail, said wheel having a drive engaging member, a pair of drive elements secured to said shaft at axially spaced locations therealong, for selective engagement with said drive engaging member, a swingable shifting lever pivotally mounted on said frame and having a connection with said shaft for axially shifting the latter between one position in which one of said elements engages said member and another position in which the other of said elements engages said member, said frame having a pair of lever holding surfaces and an over-center corner therebetween, and spring-strut means between a free end of said lever and said frame and acting to resiliently hold said lever and consequently said shaft in said one position or the other, said means including a compressible spring having one end abutting against said lever free end and its other end abuttable against said surfaces and forming an over-center linkage between said lever and frame, and actuating means carried at spaced locations along said rail for engagement by said lever to cause swinging of the latter and consequent reversal of said mechanism.

4. A power drive reversing mechanism comprising, a support frame, a drive shaft rotatably mounted on said frame and shiftable in either axial direction, a driven wheel on said frame and having a drive engaging member connected therewith, a pair of drive elements secured to said shaft at axially spaced locations therealong, said elements being shiftable with said shaft for selective engagement with said drive engaging member, a swingable shifting lever pivotally mounted at one end on said frame and having a connection intermediate its length with said shaft for axially shifting the latter between one position in which one of said elements engages said member and another position in which the other of said elements engages said drive engaging member, a stationary bracket rigidly secured to said frame and having a pair of sides arranged at approximate right angles to one another and defining an over-center corner therebetween, said bracket also having a slot therethrough and extending into both of said sides, and a resilient spring-strut between a free end of said lever and said bracket to form an over-center linkage therebetween, said spring-strut acting to resiliently hold said lever and consequently said shaft in said one position or the other; said spring-strut comprising a strut pivotally connected to said lever free end and extending loosely through said slot, and a spring on said strut and having one end acting between said lever free end and the other end bearing against either one of said bracket sides and slidable over said over-center corner in passing from one side to the other.

5. An integral drive reversing mechanism comprising, a support frame, a drive shaft rotatably mounted on said frame and shiftable in either axial direction, rotary means on said frame and having a drive engaging member connected therewith, a pair of drive elements secured at axially spaced locations on said shaft for selective engagement with said drive engaging member, a swingable lever pivotally mounted at one end on said frame and having a connection with said shaft for axially shifting the latter, a stationary bracket rigidly secured to said frame and having a pair of sides arranged at approximate right angles to one another and defining an over-center corner therebetween, said bracket also having a slot extending through both of said sides, a strut pivotally connected to said lever free end for swinging relative thereto and extending loosely through said slot, and a spring on said strut and having one end acting between said lever free end and the other end bearing against either one of said bracket sides and slidable over said over-center corner in passing from one side to the other.

6. An integral drive reversing mechanism comprising, a support frame, a drive shaft rotatably mounted on said frame and shiftable in either axial direction, rotary means on said frame and having a drive engaging member, a pair of drive elements secured on said shaft for selective engagement with said drive engaging member, a swingable lever pivotally mounted on said frame and having a connection with said shaft for axially shifting the latter, said frame having a pair of stationary sides arranged at approximate right angles to one another and defining an over-center corner therebetween, said sides having a continuous slot extending therethrough, a strut pivotally connected to said lever for swinging relative thereto and extending loosely through said slot for sliding therein, and a spring on said strut and having one end acting between said lever and the other end bearing against either one of said sides and slidable over said over-center corner in passing from one side to the other.

7. In a bunk feeder mechanism of the type having an elongated and arcuate bunk which is unobstructed along each side to permit cattle to have access thereto, an overhead rail adjacent and above said bunk and generally coextensive in length therewith, an elongated conveyor arranged generally transversely to said bunk and having a feed receiving end and a feed discharge end, said conveyor being pivotally mounted at said receiving end for swinging movement generally horizontally along said bunk, said discharge end being located above said bunk for travel therealong as said conveyor swings along said bunk whereby feed is discharged by said conveyor into and along the length of said bunk; a power drive reversing mechanism carried on said conveyor adjacent its discharge end and for engaging said rail to drive said conveyor therealong, said mechanism comprising, a support frame, a drive shaft rotatably mounted on said frame and shiftable in either axial direction, a driven wheel on said frame for travel on and along said rail, said wheel having a drive engaging member, a pair of drive elements secured to said shaft at axially spaced locations therealong, said elements being shiftable with said shaft for selective engagement with said drive engaging member, a swingable shifting lever pivotally mounted at one end on said frame and having a connection with said shaft for axially shifting the latter between one position in which one of said elements engages said member and another position in which the other of said elements engages said member, a pair of sides arranged at approximate right angles to one another and defining an over-center corner therebetween, said sides having a continuous slot extending therethrough, a strut pivotally connected to said lever and extending loosely through said slot for sliding therein, and a spring on said strut and having one end acting between said lever and the other end bearing against either one of said sides and slidable over said over-center corner in passing from one side to the other.

8. A bunk feeder for animals comprising a generally arcuate bunk, a generally arcuate guide rail arranged above said bunk, a trolley carriage on said guide rail and movable therealong, a feed conveyor having a delivery end supported by said carriage and a receiving end mounted at substantially the center of curvature of said rail, a reversible propelling means on said carriage and comprising a support frame, a drive shaft rotatably mounted on said frame and shiftable in either axial direction, a drive wheel on said frame and engageable with said rail, said wheel having a drive engaging member, a pair of drive elements secured on said shaft for selective engagement with said drive engaging member, a swingable lever pivotally mounted on said frame and having a connection with said shaft for axially shifting the latter, said frame having a pair of stationary sides arranged at approximate right angles to one another and defining an over-center corner therebetween, said sides having a continuous slot extending therethrough, a strut pivotally connected to said lever for swinging relative thereto and extending loosely through said slot for sliding therein, and a spring on said strut and having one end acting between said lever and the other end bearing against either one of said sides and slidable over said over-center corner in passing from one side to the other.

9. A feeder as defined in claim 8 including a power drive connection between said conveyor and said propelling means, and a pivot connection between said carriage and conveyor and located closely adjacent said drive connection.

References Cited in the file of this patent

UNITED STATES PATENTS

| | | |
|---|---|---|
| 619,423 | Kruse | Feb. 14, 1899 |
| 944,604 | Einfeldt | Dec. 28, 1909 |
| 1,038,588 | Iverson | Sept. 17, 1912 |
| 1,222,219 | La Font | Apr. 10, 1917 |
| 1,487,001 | Williams | Mar. 18, 1924 |